Patented July 5, 1932

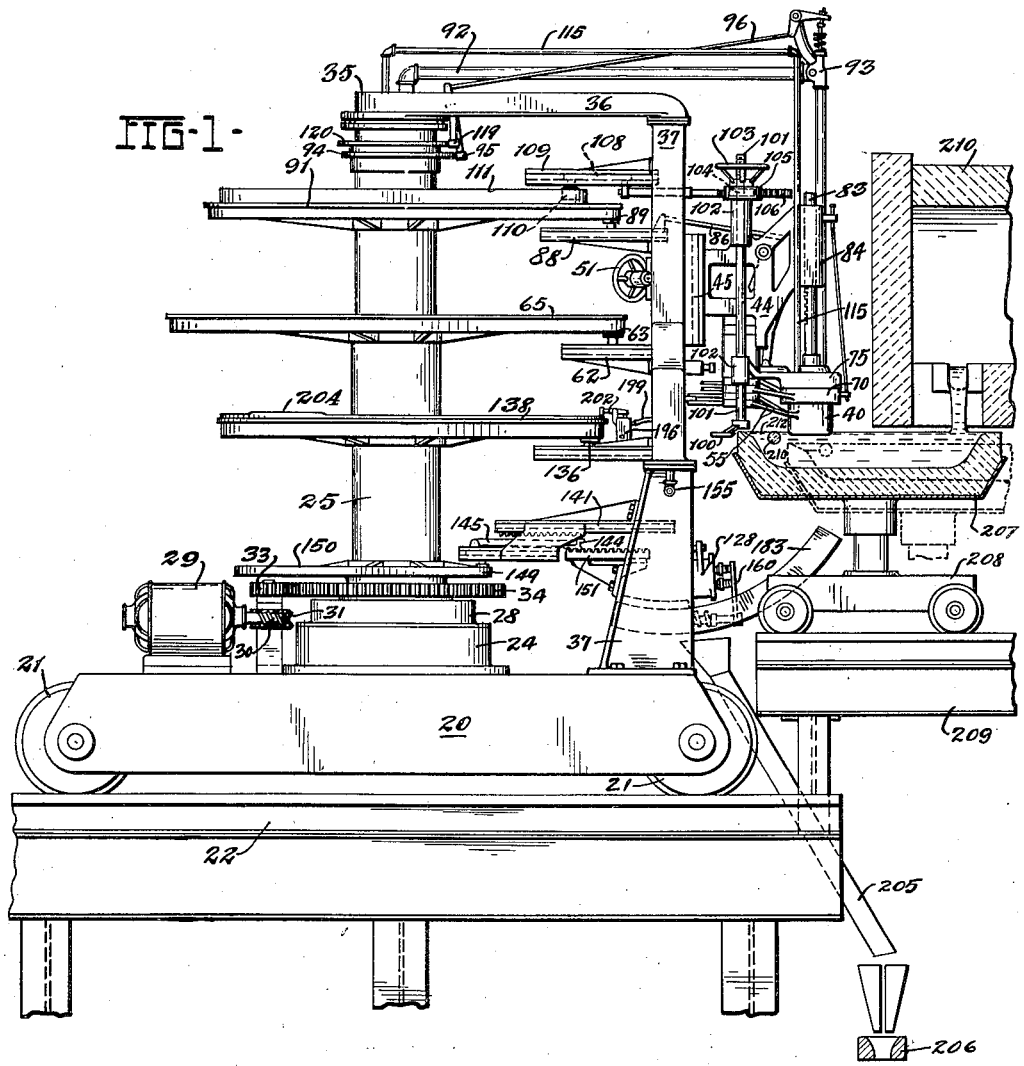

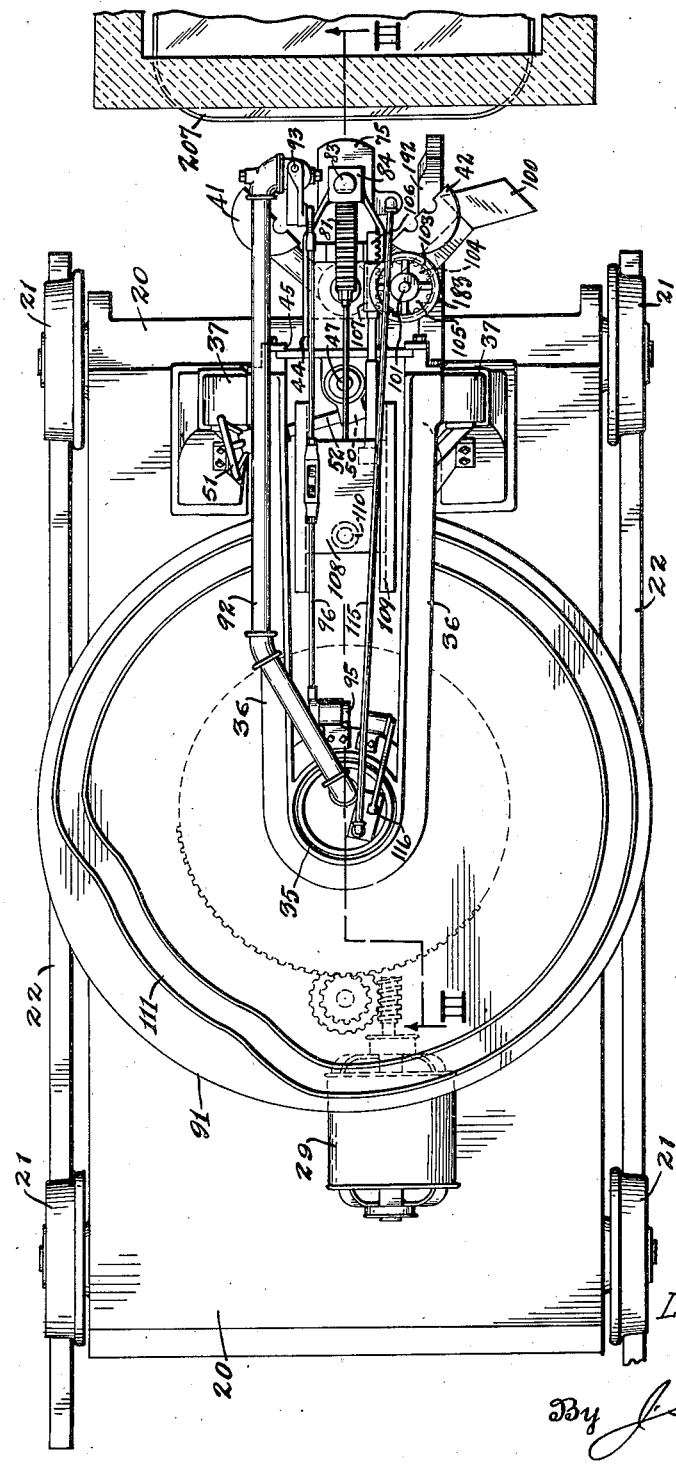

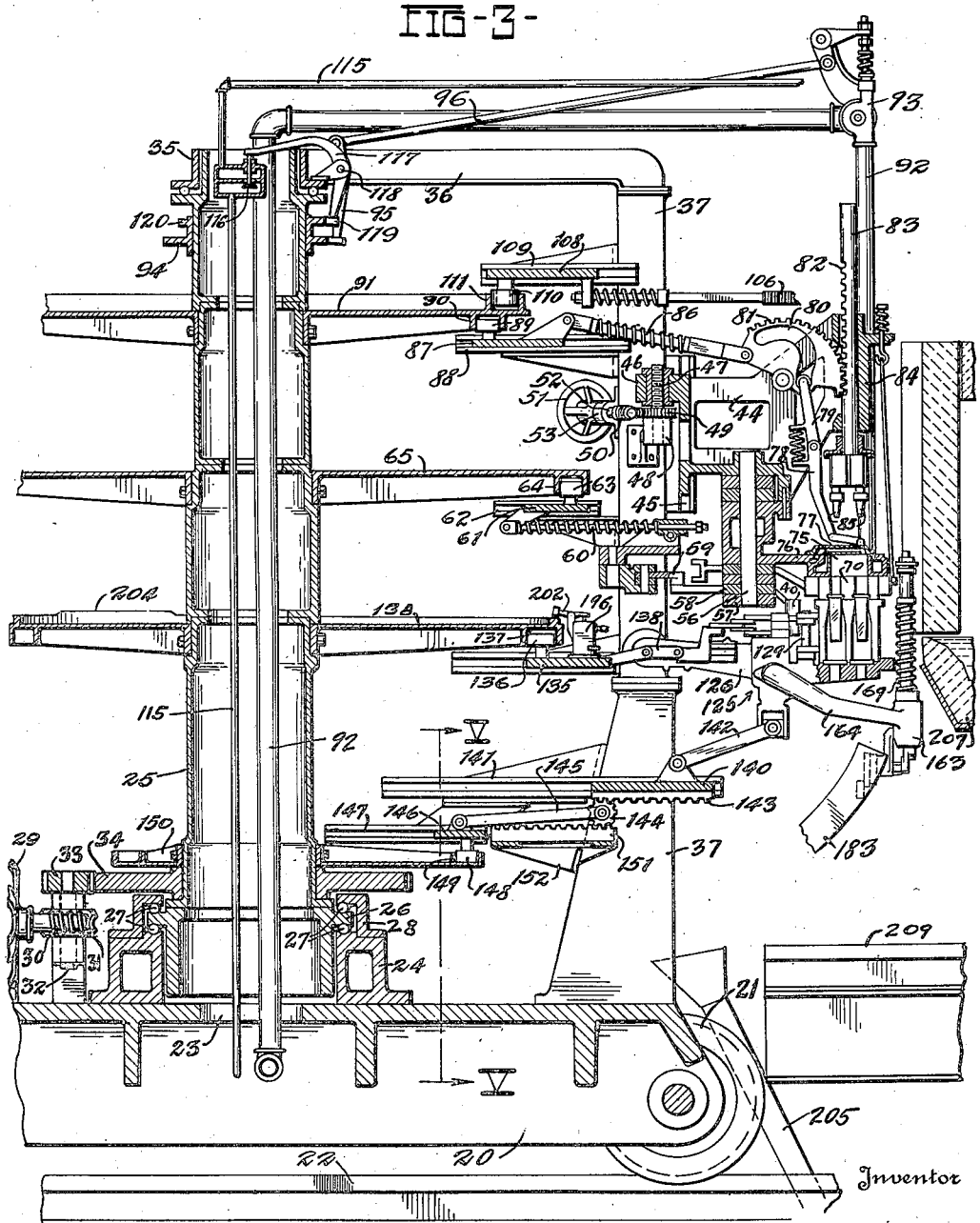

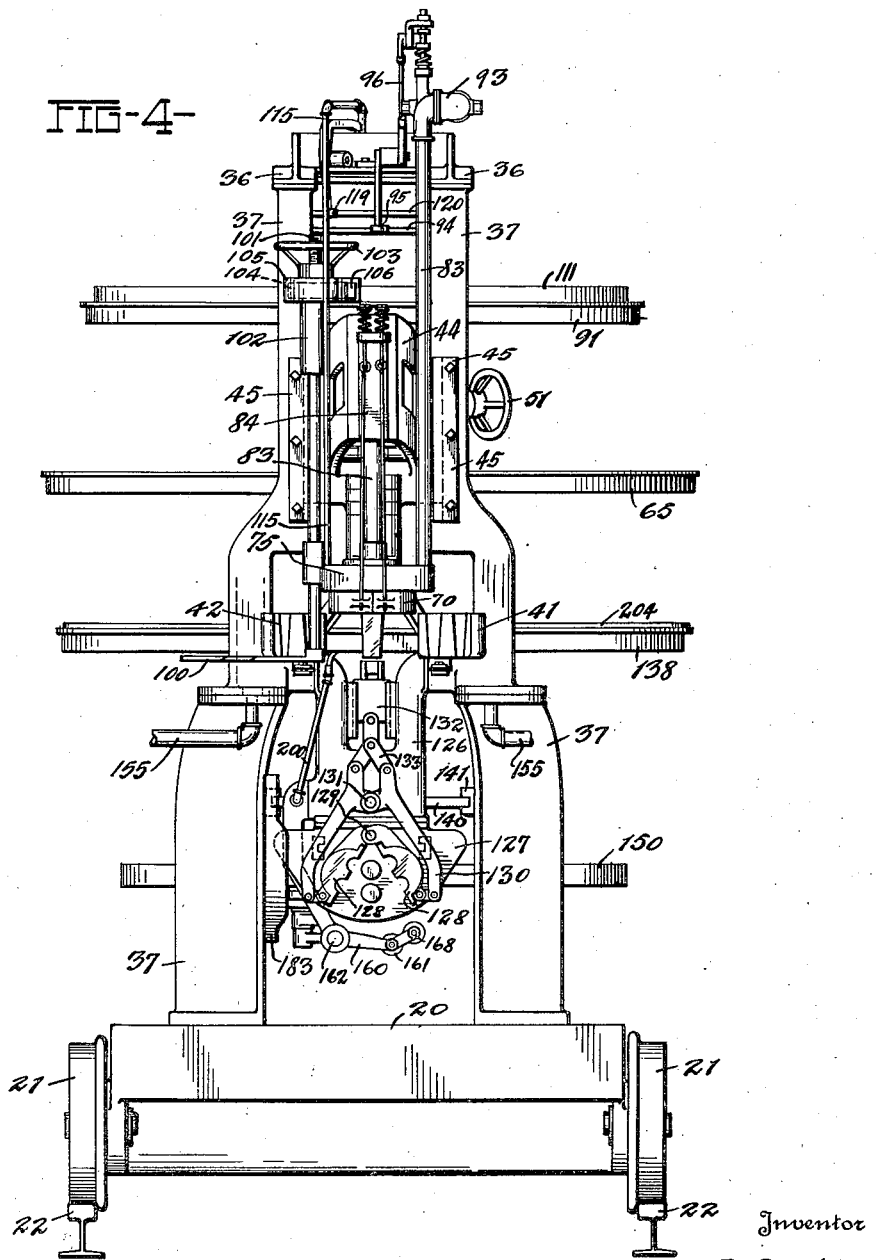

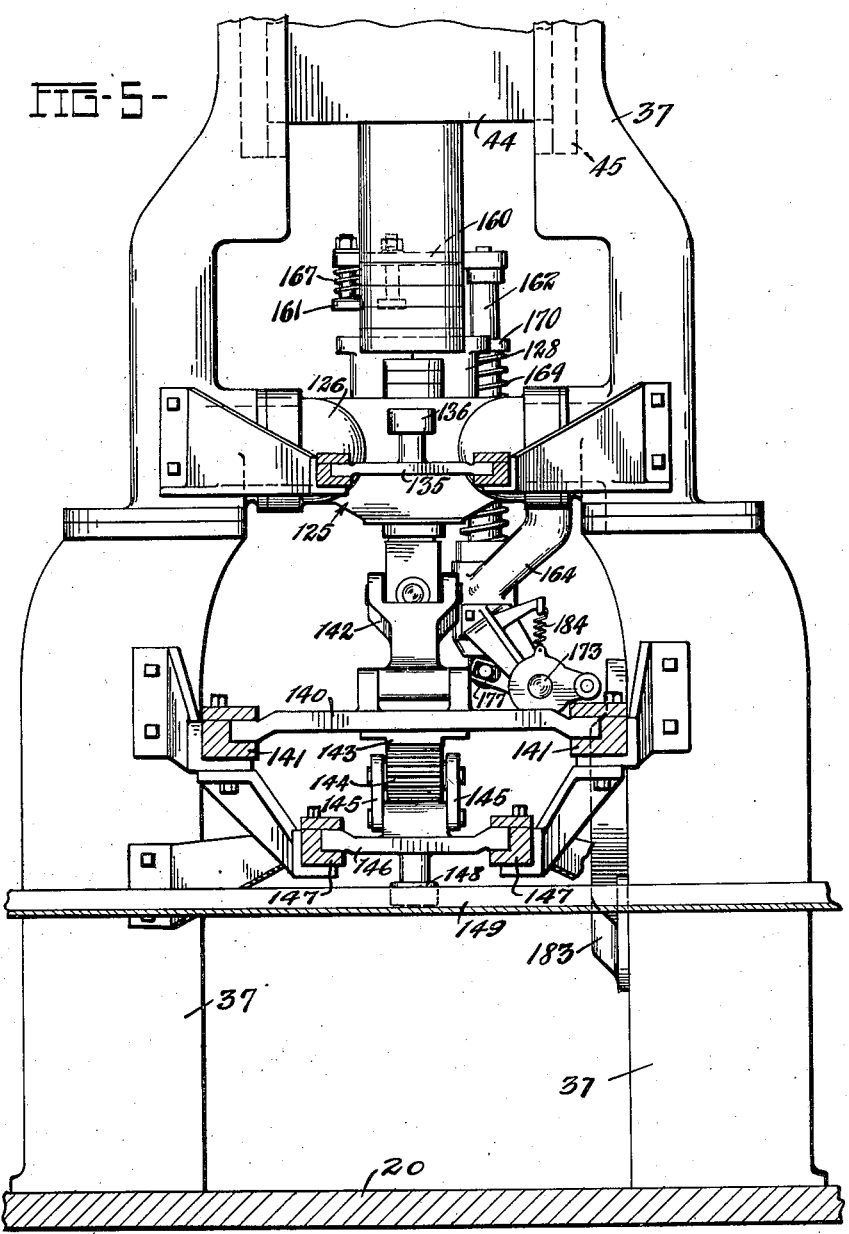

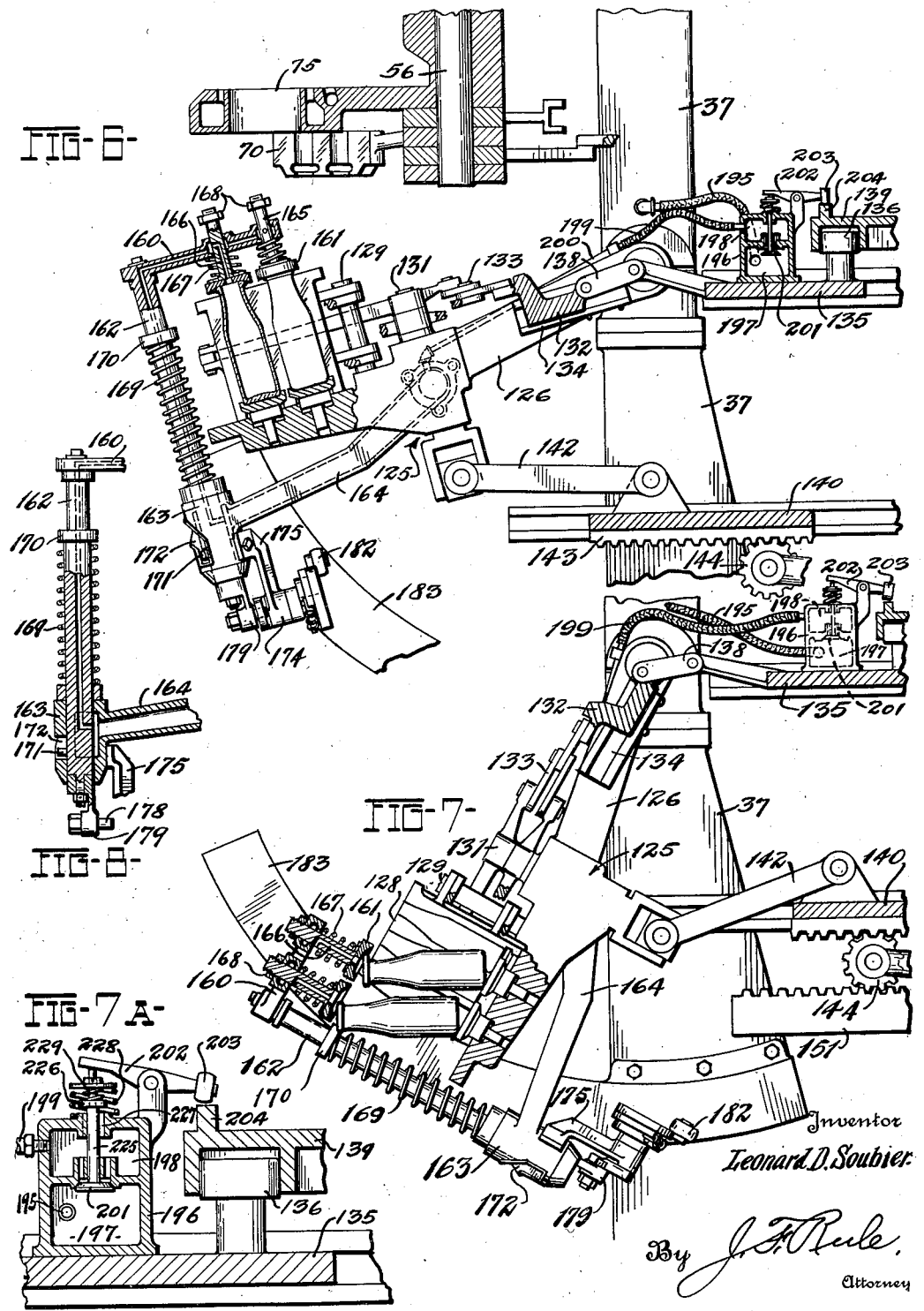

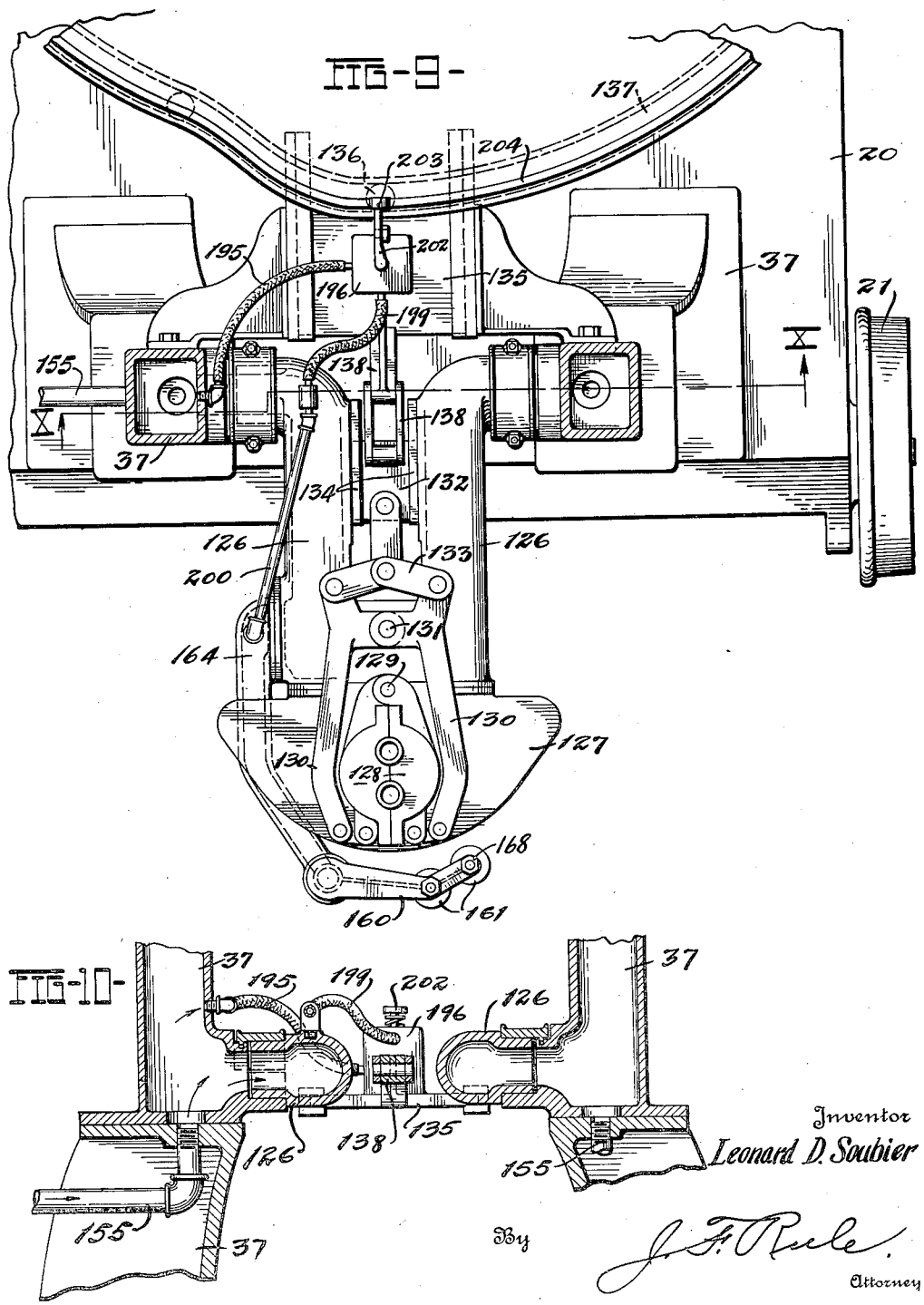

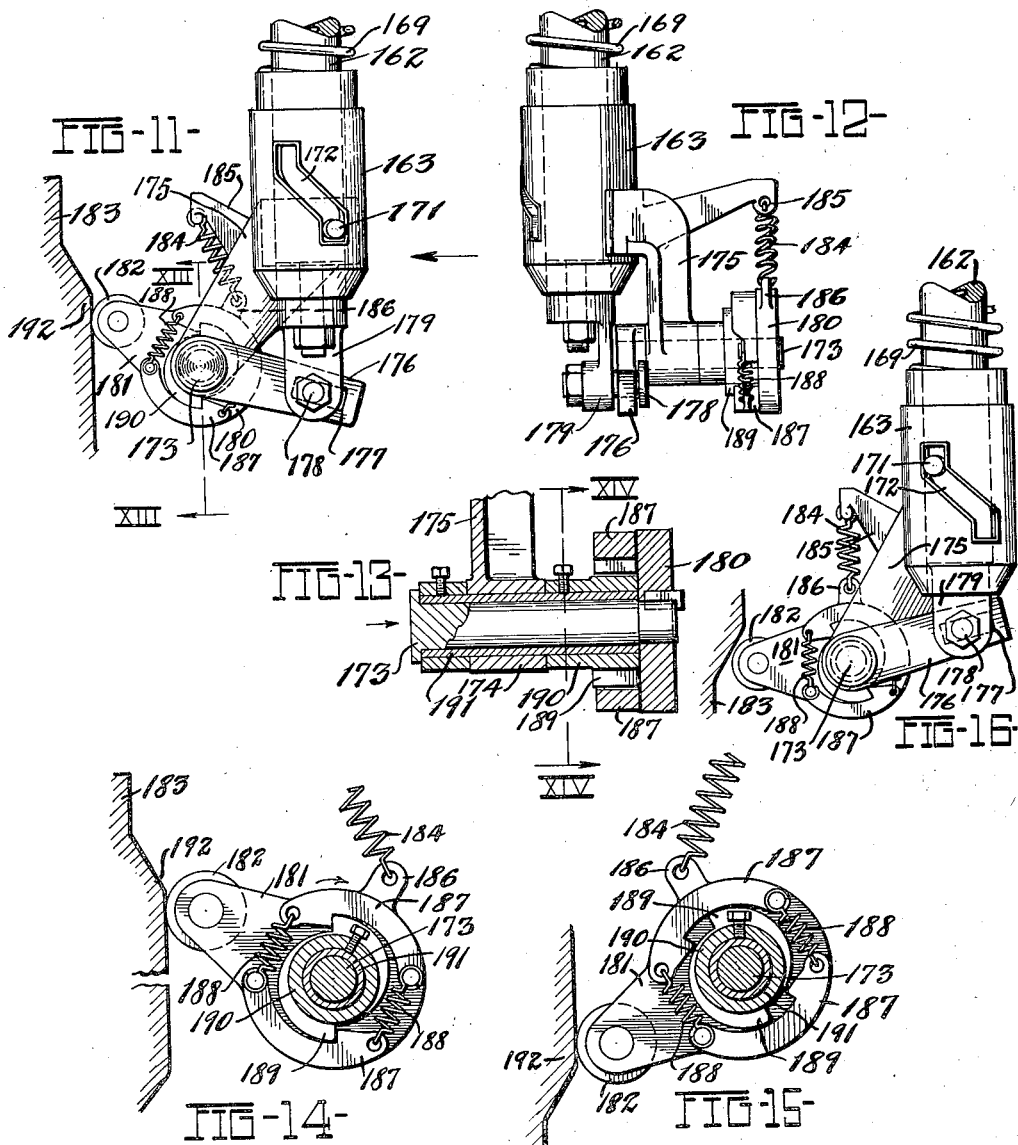

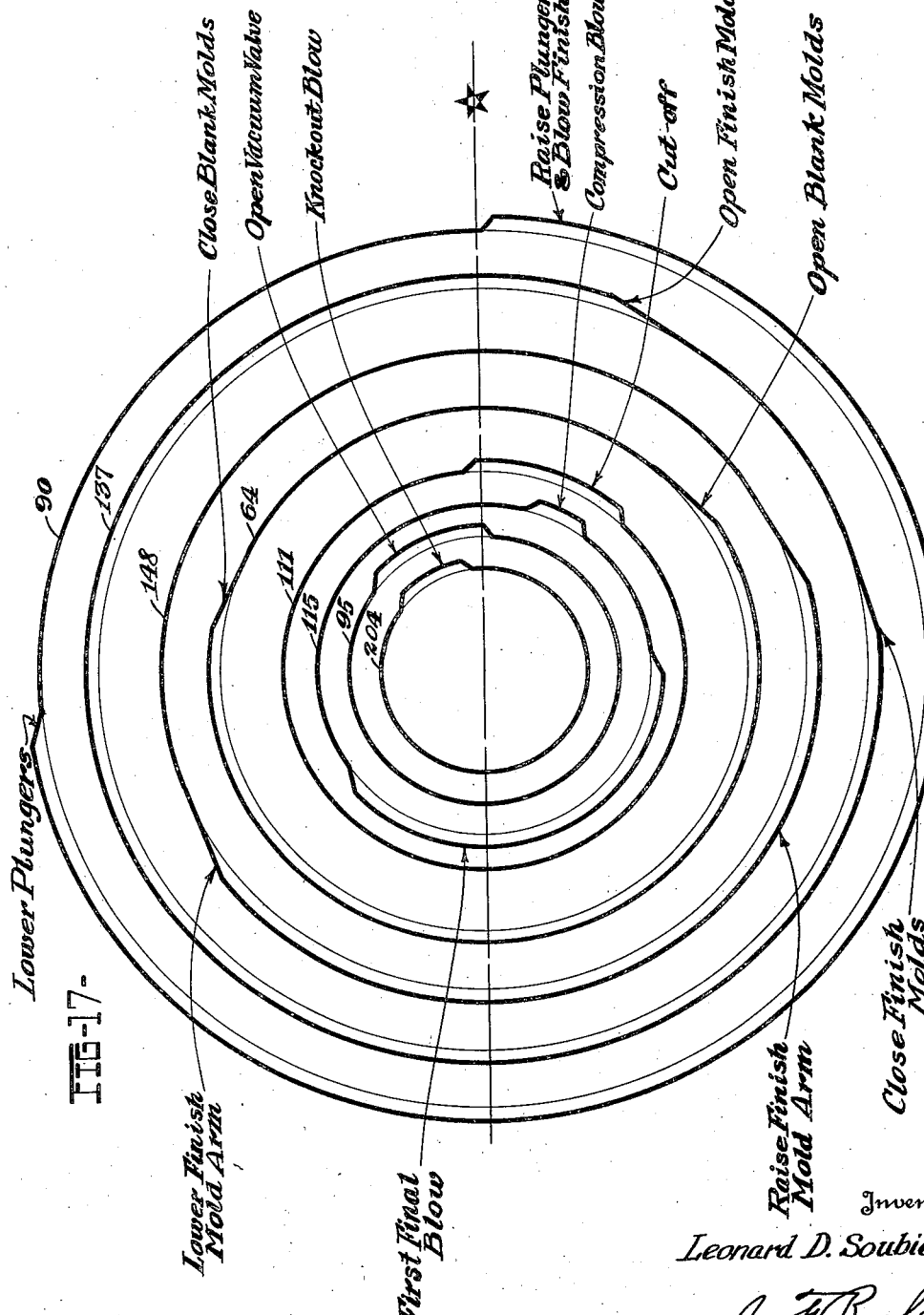

1,865,730

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS FORMING MACHINE

Application filed May 18, 1927. Serial No. 192,232.

The present invention relates to improvements in glassware forming machines and more particularly to that type in which the charges of molten glass are gathered into the parison or blank molds by suction.

In the production of blown glassware it is desirable to minimize the extent of movement to which the blank is subjected during its formation and transfer to the finishing molds, to thereby prevent undue distortion of the skin or film forming the surface of the parison or blank. Lateral bending and other similar movement of the parison quite frequently breaks or distorts the skin or film in proximity to the neck and shoulder portions and results in "checked" or roughened surfaces in the finished ware. Ware so formed is of course undesirable.

An object of the present invention is to overcome the above objectionable condition by providing a glassware blowing machine in which the blank or parison is held absolutely stationary from the time it assumes its blank formation, until it has taken on the form of the finished article. Thus, it is evident that checked or roughened areas due to blank movement are readily eliminated.

A further object is to provide means for giving the ware being formed, a secondary blow in the finishing mold during movement of the latter between the blank transfer and blow station, and the ware ejecting station so that the glass will be firmly set and completely expanded to the precise form of the mold. Thus, the ware is initially blown in the usual manner at the station at which it is transferred from the blank mold to the finishing mold, and is again subjected to internally applied air pressure, insuring proper shaping and setting of the articles prior to ejection from the forming machine.

Another object is to provide a relatively small glassware forming machine which is economical in operation and capable of large quantity production. To this end, the machine comprises a single unit embodying a non-rotative mold carriage mounting a stationary blank mold, together with neck and finishing molds and other elements necessary in forming blown glassware, said molds and associated parts being automatically operated in timed relation to each other. A machine of this type is particularly well adapted for use in handling relatively small orders for glassware which could not be profitably filled by use of the average large machine requiring change of a number of molds and numerous adjustments. Obviously, it is more or less impractical to employ a large machine in handling small orders in that it involves carrying a great number of molds in stock; perhaps seldom using these molds; and expenditure of considerable time in changing molds and adjusting parts on the several heads. A relatively small economically operated machine as herein disclosed, eliminates the above objections.

Other objects will be apparent hereinafter.

In the accompanying drawings:

Fig. 1 is a side elevation of the machine showing the blank mold in position to gather molten glass from the supply body, the latter being contained in a tank movable into and out of a position causing charge gathering engagement of the glass with said mold.

Fig. 2 is a plan view of the machine.

Fig. 3 is a sectional view taken substantially along the line III—III of Fig. 2.

Fig. 4 is a front elevation of the machine showing the blank mold open and a parison suspended from the neck mold just prior to enclosure by the finishing mold.

Fig. 5 is a sectional view taken along the line V—V of Fig. 3.

Fig. 6 is a detail sectional view of the finishing mold in position to permit application of a secondary blow through the knock-out arm to articles in said mold.

Fig. 7 is a view similar to Fig. 6, but shows the mold sections open, permitting ejection of ware therefrom.

Fig. 7—A is a detail sectional view showing the valve to control the secondary blowing air.

Fig. 8 is a fragmentary detail sectional view showing the connection between the air passageways through the several parts of the knock-out arm.

Fig. 9 is a plan view illustrating the air pipe line connections between the knock-out arm and the air control valve.

Fig. 10 is a sectional view taken substantially along the line X—X of Fig. 9.

Fig. 11 is a detail elevation showing the cam actuated mechanism for moving the knock-out arm to and from its operative position.

Fig. 12 is a side elevation of the mechanism shown in Fig. 11 taken at right angles to the showing in Fig. 11, looking in the direction of the arrow.

Fig. 13 is a sectional view taken along the line XIII—XIII of Fig. 11.

Fig. 14 is a sectional view taken along the line XIV—XIV of Fig. 13.

Fig. 15 is a view similar to Fig. 14, but shows the clutch jaws disengaged from each other.

Fig. 16 is a detail showing the knock-out control means positioned at the lower end of the stationary cam.

Fig. 17 is a plan view illustrating the layout of the cams for operating the molds, air control valves, etc.

Referring to the accompanying drawings, the machine comprises a base 20 supported on wheels 21 which are arranged upon trackways 22, such construction providing for movement of the machine toward and away from the furnace as will be apparent hereinafter.

The base 20 (Figs. 1 and 3) is provided with an opening 23 through which vacuum and air pressure supply pipes extend to any suitable source of supply. An annular bearing ring 24 is mounted upon the base 20, around said opening 23, and serves to support a vertical central column 25, including a circumferential rib 26 between which and said bearing ring 24 is arranged a series of anti-friction balls 27. A cap 28 houses the rib 26 and anti-friction balls serving to retain the latter in proper position.

The central column 25 may comprise a series of short sections suitably interconnected and having fixed thereto, preferably at the meeting ends of the sections, a number of tables, each having one or more cam tracks formed thereon. This column is continuously rotated about a vertical axis by means of a motor 29 whose shaft drives a worm 30 running in mesh with a worm gear 31 fixed to a short vertical shaft 32 whose upper end carries a pinion 33 running in mesh with a gear 34 fixed to the lower portion of the cam carrying column 25. The upper end of the column 25 is journalled in a bearing 35, preferably formed integral with and interconnecting corresponding ends of a pair of radial arms 36, said arms being supported upon the upper ends of a pair of spaced standards 37 rising from the machine base 20 adjacent the inner end of the latter. These vertical standards 37 support the forming molds and the other elements cooperating therewith as will be described hereinafter.

The blank mold 40 comprises coacting sections 41 and 42 (Fig. 4) supported on a frame 44 which is vertically adjustable in slideways 45 formed on said vertical standards 37.

This mold carrying frame 44 is formed with an inward extension 46 (Fig. 3) having threaded connection with a vertical rod 47 whose lower end is journalled in a bearing 48 spaced below said extension 46. Between the bearing 48 and extension 46, a worm gear 49 is fixed to the rod 47 for rotation therewith, said gear running in mesh with a worm 50 rotatable by means of a hand wheel 51, fixed to the opposite end of a shaft 52 which carries said worm. This shaft 52 is journalled in a bearing 53 on one of the vertical standards 37. By rotating the hand wheel 51, the mold carrying frame 44 may be adjusted vertically to change the elevation of the blank mold 40 as conditions require.

The blank mold sections 41 and 42 are carried by arms 55 (Fig. 1) mounted on a common pivot (Fig. 3) comprising a vertical fulcrum pin 56 depending from said mold carrying frame 44. Collars 57 and 58 fixed to the arms 55 are connected by links 59 and a yieldable connection 60 to a slide 61 movable in guideways 62. This slide 61 carries a cam roll 63 running in a cam trackway 64 formed on the lower side of a table 65 fixed to and rotating with the vertical column 25. Continuous rotation of the column 25 and with it the cam 64, moves the slide 61 radially at proper intervals, causing periodic opening and closing of the blank mold 40.

A neck mold 70 (Figs. 1 and 3) comprises a pair of cooperating sections fulcrumed to the vertical pin 56 and adapted to be opened at a predetermined interval following opening of the blank mold 40. Opening of the neck mold 70 is effected by a secondary opening movement of the blank mold sections in the usual well known manner.

A gathering or blowing head 75 (Fig. 3) is carried by an arm 76 which is non-rotatably mounted upon the aforementioned pivot pin 56, said blowing head being of the usual construction and including a blow slide valve 77 movable at times to cover the open upper end of said head.

The blow slide 77 is secured to the lower end of a lever 78 pivoted to the mold carrying frame 44 and mounting at its upper end a cam roll running in a cam trackway 80, formed in a gear segment 81. The teeth of this gear segment run in mesh with the teeth of a rack bar 82 on a plunger rod 83, the latter being slidable vertically in a guideway 84 and carrying at its lower end plunger tips 85, corresponding in number to that of the mold cavities. The gear segment 81 has a yieldable connection 86 with a slide 87 mounted in suitable guides 88 which are rigidly fixed to the vertical standards 37 (Figs. 1 and 3.) The slide 87 mounts a cam roll 89 running in a cam trackway 90 formed on the lower side of a table 91 which is fixed to and rotates with the central column 25. Thus, it is seen that radial movement of the slide 87 rocks the gear segment 81, causing the plunger tips 85 and blow slide 77 to coact alternately with the blowhead 75 in the formation of ware.

A vaccum pipe 92 extending through the vertical central column 25 is connected to the blowing or gathering head 75 so that a vacuum or partial vacuum may be formed in said gathering head and blank mold when the latter is in charge gathering position. This vacuum pipe 92 is provided with a valve 93 by which the application of vacuum to said blowhead and mold is controlled. The valve is operated at predetermined time intervals by a mechanism including a continuously rotating cam 94 which rocks the lever 95 about its fulcrum, said lever having operative connection to the valve 93 through a connecting rod 96 (Fig. 3).

After the charge of glass enters the blank mold 40, a cut-off knife 100 is swung across the bottom of the mold severing the excess glass at and closing the open ends of the mold cavities. This cut-off knife 100 is fixed to the lower end of a rod 101 journalled in vertically spaced bearings 102, formed on the mold carrying frame 44 (Fig. 1). The upper end of the rod 101 is threaded and carries a hand wheel 103 which provides for vertical adjustment of the rod and cut-off knife 100. Interposed between the upper bearing 102 and the hand wheel 103 (Fig. 1) is a housing 104 enclosing a pinion 105 running in mesh with the teeth of a rack bar 106. This rack bar (Figs. 1, 2 and 3) moves in a guide 107 adjacent said housing 104 and has its inner end connected to a slide 108 movable in guides 109 which are fixed to the vertical standards 37. A cam roll 110 is carried by the slide 108 and runs in a cam track 111 formed on the upper table 91 which, as heretofore stated, rotates continuously with the central column 25. Thus it is seen that continuous rotation of the column 25 causes reciprocation of the rack bar 106 and operatively positions the cut-off 100 at predetermined intervals.

Blowing air is supplied to the blowhead 75 through a supply pipe 115 in the usual manner (Figs. 1 and 3). Communication between the air pressure supply pipe 115 and the interior of the blowing head 75 is established at predetermined intervals by movement of the aforementioned valve slide 77 (Fig. 3). A main control valve 116 is arranged in the air supply pipe 115 (Fig. 3), said valve being actuated by a lever 117 fulcrumed upon a bracket 118, carried by the upper bearing 35 in which the upper end of the central column 25 is journalled. This valve control lever 117 carries a cam roll 119 at its lower end running upon a cam track 120 spaced slightly below the upper end of said central column 25. Thus, it is seen continuous rotation of the central column 25 and cam track 120 causes periodic actuation of the valve 116 and permits injection of blowing air into the head 75 at proper intervals.

A finishing or blowing mold is carried by a frame 125, mounted between the vertical standards 37 for vertical swinging movement into and out of operative engagement with the neck molds 70. This finishing mold frame comprises a pair of hollow arms 126 (Figs. 4 and 9), the forward ends of which are connected to a mold carrier or holder 127 upon which the mold halves are mounted. These mold halves or sections 128 have their inner ends fulcrumed to a common pivot pin 129, while their forward ends have link connection with a pair of inwardly extending arms 130, which are fulcrumed to a common pivot pin 131 disposed rearwardly of the mold section connecting pin 129. The arms 130 extend rearwardly of the fulcrum point and are connected to a slide block 132 by suitable links 133, said slide block being supported in guides 134 formed on the adjacent faces of the hollow arms 126 of the finishing mold frame. A slide 135 is arranged rearwardly of the slide block 132, carries a cam roll 136 running in a cam track 137 on the table 138, and is connected to the aforementioned slide block 132 by suitable links 138 (Figs. 6 and 9). This last named slide 135 mounts a valve 201 to control flow of secondary blowing air, as will be described hereinafter. The link and slide block mechanism, together with the cam structure, provides for opening and closing of the finishing mold at proper intervals.

The finishing mold is lifted and lowered in timed relation to its opening, and to actuation of the blank mold, by means of a slide 140 arranged in guideways 141 mounted on the vertical standards 37 (Fig. 3). This slide 140 is connected to the finishing mold frame 125 by means of a link 142 (Figs. 3 and 6) and is provided with a series of rack teeth 143 on its lower side. A pinion 144 runs in mesh with the rack teeth 143 and is mounted at the outer end of an arm 145 whose inner end is pivoted to a slide 146 movable radially in guideways 147. This slide 146 carries a cam roll 148 which runs in a cam trackway 149 (Fig. 3), formed on the upper side of a table 15. A second rack bar 151 (Fig. 3) is supported upon a bracket 152 mounted upon the lower portions of the vertical standards 37, said rack bar also running in mesh with the aforementioned pinion 144. This rack bar 151 and pinion mechanism serves to quickly raise and lower the finishing mold frame.

The hollow arms 126 of the finishing mold carrying frame have swivel connection to the vertical standards 37, portions of the latter being hollow and connected to a suitable air supply source by way of pipes 155. This construction provides for supply of cooling air to nozzles or the like (not shown) which may be arranged upon the mold carrier 127 to prevent excessive heating of the molds.

The finishing mold is equipped with a "knock-out" arm 160 which carries a number of knock-out disks 161 corresponding in number to that of the mold cavities. This knock-out arm is fixed to the upper end of a rock shaft 162 whose lower end is journalled in a bearing 163 and has a limited sliding and oscillative movement therein. This bearing 163 is rigidly fixed to the outer end of a hollow arm 164 mounted upon one of the arms 126 of the finishing mold frame 125. The rock shaft 162, knock-out arm 160, and the stems 165 whch carry knock-out disks 161 and are slidable through said knock-out arm, are of hollow formation providing communication between the bearing supporting arm 164 and the interior of ware being blown in the finishing mold. The stems 165 slidably mounted in the knock-out arm 160 and supporting the disks 161, are formed with longitudinal passageways 166 opening at one end through said disks and have their other ends opening into radial ports. A coil expansion spring 167 surrounds each stem 165 between the disk 161 and said knock-out arm 160. This spring 167 normally tends to hold each disk and the knock-out arm spaced apart to a degree which is determined by the position of the adjusting nut 168. By changing the relative positions of the nuts 168 on these stems 165, the tension placed on the springs 167 may be varied to control the time interval between ejection of articles from the mold. When the disks 161 are seated upon the upper open ends of articles in the finishing mold, the radial ports at one end of the passageways 166 through the disk carrying stems, are so positioned that they provide communication between the passageway through the knock-out arm 160 and the interior of said articles whereby air pressure may be applied internally of the latter.

A coil spring 169 surrounding the rock shaft 162 between a collar 170 on said shaft, and the bearing 163, serves to normally hold the knock-out arm in its uppermost position. The rock shaft 162 carries a pin 171 near its lower end extending radially into an angular slot 172 formed in the bearing 163 (Figs. 6 and 11). This pin and slot arrangement, together with the coil expansion spring 169, serve to normally position the knock-out arm and disks at one side of the finishing mold during the initial blowing of the ware and just prior to ejection of the ware from the mold.

A cam mechanism arranged at the lower end of the rock shaft 162 is actuated at predetermined time intervals to cause rocking of said shaft 162 to position the knock-out disks over the open upper ends of the ware in the finishing mold. Simultaneously with rocking of said shaft, the cam mechanism operates to move the shaft longitudinally in its bearing 163, causing seating of the disks upon the open upper ends of the ware. This mechanism includes a tube or sleeve 191 journalled in a bearing 174 formed at the outer end of a bracket 175 which is suitably mounted upon the bearing 163 in which the rock shaft 162 is journalled. A shaft 173 extends through said sleeve 191 and is free to oscillate therein. One end of this shaft 173 is formed with a disk-like head abutting one end of said sleeve and coacting with a head 180 keyed to the other end of said shaft to prevent relative longitudinal movement between said sleeve and shaft. A radial arm 181 formed on the head 180 carries a cam roll 182 which rides over the face of a stationary arcuate cam 183 whose lower inner end is suitably connected to one of the standards 37 (Fig. 7). This cam 183 is formed with an offset 192 for a purpose hereinafter apparent.

The head 180 at one end of the shaft 173 pivotally mounts a pair of opposed clutch members 187 which are interconnected by means of coil springs 188 serving to yieldably hold said clutch members in their innermost positions. These clutch members 187 at times engage teeth 189 formed on a sleeve 190 which is telescoped over and locked to the main sleeve 191 (Figs. 13 and 14). Thus, it is seen that rocking of the arm 181 and head 180 transmits a corresponding movement to the main sleeve or tube 191 through said clutch members and teeth on the sleeve 190. This rocking movement is also transmitted to an arm 176 which is suitably fixed to the sleeve 191 opposite said head 180 and has a connection to an extension 179 through a pin 178 and slot 177. This extension 179 is swiveled to the lower end of the rock shaft 162 permitting combined longitudinal and rocking movement of the rock shaft 162 when the arm 176 is rocked. A coil spring 184 having one end connected to a bracket 185 extending outwardly from the bearing 163 and its other end connected to an eye 186 on the head 180, assists the coil expansion spring 169 in maintaining the cam roll 182 and its carrying arm in a substantially horizontal position while the roll is disengaged from the offset 192 of the cam 183 (see Fig. 16).

Just after the finishing mold starts its downward movement, the cam roll 182 strikes the upper end of the off-set 192 on the stationary cam causing rocking of the arm 181 and transmitting a rocking movement through the clutch devices to said sleeve 191 and the arm 176. The rock shaft 162 is thereby moved downwardly and at the same time rocked about its axis, bringing the knock-out disks 161 to a position in which they snugly seat upon the open upper ends of articles in the finishing mold. These disks are so positioned during substantially the entire downward movement of the finishing mold and are disengaged from the articles just after the finishing mold sections have entirely opened to permit ejection of the articles. When the finishing mold reaches the ware ejecting station, the coil springs 184 and 169 (Fig. 16) coact to so position the cam roll 182 and its supporting arm 181 that upon upward movement of the mold, the roll and arm will be rocked downwardly assuring retention of the disks 161 in an inoperative position until the blanks have been blown in the finishing mold.

During upward movement of the finishing mold, the mechanism which actuates the knock-out arm assumes substantially the position shown in Fig. 15 wherein the clutch members are disengaged from the jaws 189, and the coil spring 169 functions to hold the knock-out arm in its uppermost position. Upon its arrival at the upper end of the stationary cam 183, the arm 181 and cam roll 182 are lifted to a position substantially corresponding to that shown in Fig. 16 whereby upon downward movement of the mold, said roll and arm may be readily rocked upwardly due to engagement between the cam roll 182 and the offset 192 on the cam 183. Thus, the rock shaft 162 is moved downward and rocked to seat the disks 161 upon the upper ends of the articles in the mold.

During the time that the knock-out disks are seated upon the ware in the finishing mold, a final blowing operation is effected by air pressure supplied through the disks 161 to the interior of the ware. This application of air pressure to the ware during lowering of the finishing mold after the initial blowing in the finishing mold has taken place, serves to firmly set the glass and insures against collapsing of the walls or other portions during and following ejection from the mold. This cooling air is obtained by tapping one of the hollow standards 37, and providing a flexible pipe connection 195 between said standard and a valve 196 carried by the slide 135 which opens and closes the finishing mold. This valve includes a lower chamber 197 into which the cooling air enters directly from the standard 37, and an upper chamber 198 from which the cooling air passes to the knock-out supporting arm 164 by way of a flexible pipe 199 and a rigid pipe 200, the latter being mounted upon one of the arms 126 included in the finishing mold frame. The valve disk 201 prevents communication between the chambers 197 and 198 except during said final blowing operation. A valve control lever 202 is fulcrumed to a bracket rising from the valve housing, said lever carrying at one end a cam roll 203 running upon a cam track 204 formed on the upper side of the cam table 138.

The stem 225 which carries the valve disk 201 (Fig. 7—A) extends upwardly through the valve casing 196 and carries a relief valve 226 adapted to seat on the casing. The passageway through which the upper portion of the valve stem 225 extends is formed with an annular series of ports 227 which are closed by the valve 226 when the valve 201 is open, the valve 226 being yieldably held on its seat by a coil spring 229. The cam 204 is so formed that it permits the valve stem to be lifted by a coil spring 228 and seat said valve disk 201 just before the finishing mold sections separate, thereby shutting off the application of air pressure internally of the articles.

Simultaneously with seating of the disk 201, the relief valve 226 is lifted thereby releasing the air pressure within the articles just prior to opening of the finishing mold.

A chute 205 (Figs. 1 and 3) is arranged with its upper end in position to receive articles ejected from the finishing mold and has its lower end disposed in proximity to a suitable conveyor 206 which may be in the form of a leer pan which may support a predetermined number of articles during their passageway through a leer, or in the form of a belt conveyor or other transfer device which transfers ware from the forming machine to the receiving end of a leer.

Molten glass is supplied to the forming machine by providing a tank or pot 207 mounted upon a wheeled carrier 208 movable along a track 209 (Fig. 1). This tank 207 has a combined longitudinal and vertical movement so that the supply body of glass is periodically lifted into charge gathering contact with the open lower end of the blank mold 40, permitting gathering of charges at proper time intervals. A dam 210 is arranged transversely of the forward end of the tank 207 to form a separate cut-off receiving area 212 in which the chilled strings or tail portions of glass are deposited immediately following actuation of the cut-off knife. The details of construction and specific method of operation of this pot 207, constitutes the subject matter of my Patent No. 1,771,864, granted July 29, 1930, to which reference may be had for such details.

The operation of the machine is as follows:

Assume that the motor 29 is running, causing continuous rotation of the column 25 and the cams carried thereby. At a predetermined interval, the molten glass supply pot 207 is moved forwardly from beneath the tank extension 210 and simultaneously lifted to an elevation at which charge gathering contact between the molten glass and the blank mold 40 is effected. Just before charge gathering contact between the glass and mold is effected, the plunger tips 85 (Fig. 3) are projected downwardly through the neck mold 70 so that initial blowing openings will be formed in the blanks as the charges are gathered. The cam 94 at the upper end of the central column 25 operates to rock the lever 95 about its fulcrum, causing opening of the valve 93 in the vacuum pipe 92 whereby a partial vacuum is created in the gathering head to effect gathering of glass into the blank mold in a manner well known in the art. Following this operation, the molten glass supply tank is lowered and at the same time moved laterally away from the blank mold. When the tank approaches a position in which the blank mold 40 and the gathering area 212 are vertically aligned, the cut-off knife 100 swings across the bottom of the mold to close the lower ends of the mold cavities and sever tail portions of glass which are then deposited in said cut-off receiving area 212.

This cut-off knife is actuated by the rack and pinion mechanism whose movement is caused by the cam 111 on the table 91 adjacent the upper end of the central column 25 (Figs. 1 and 3). The cam 64 on the intermediate table 65 now operates to move the slide 61, which in turn effects movement of the links 59, causing opening of the blank mold 40. Simultaneously with opening of the blank mold 40, the cams 149 and 137 (Figs. 3 and 6) operate to lift the finishing mold and bring the sections 128 together to enclose the blanks, which at this period are suspended bare from the neck mold 70. Following this operation, the cam 90 on the table 91 at the upper end of the vertical column 25, causes rocking of the gear segment 81 to lift the plunger tips away from the blowing head 75 and at the same time move the valve slide 77 laterally to cover the upper end of the blowing head 75. Substantially simultaneously with positioning of the valve slide 77 over the blowing head 75, the cam 120 at the extreme upper end of the vertical column 25 (Fig. 3) operates to open the valve 116 in the blowing air supply pipe 115 admitting air pressure to the blowing head 75 whereby the blanks are blown to the shape of the articles being produced. Upon completion of this blowing, the blank mold sections 41 and 42 move outwardly a predetermined distance beyond the initial open position and cause the neck mold sections 70 to separate, such operation being common in Owens type machines. Immediately following separation of the neck mold sections, the cam mechanism, including the cam 149 and cam roll 148 at the lower end of the vertical column 25, operates to move the finishing mold downwardly away from the neck mold and blowing head.

During downward movement of the finishing mold, the articles therein are subjected to a secondary blowing as heretofore pointed out. This secondary blowing is effected by the application of air pressure through the knock-out supporting arm, rock shaft and the knock-out disks (Fig. 6). The secondary blowing air is taken from one of the hollow standards 37 through the flexible pipes 195 and 199 between which pipes the control valve 196 is arranged. Immediately following seating of the knock-out disks 161 upon the articles in the finishing mold, the cam 204 (Fig. 6) operates to cause opening of the valve 196, permitting passage of air through said pipes and knock-out supports for internal application to the articles in the finishing mold. This secondary blowing air is applied for a predetermined length of time and obviously is cut off simultaneously with or just in advance of lifting the knock-out disks out of engagement with the articles in the finishing mold. As heretofore pointed out, the relief valve disk 226 is lifted simultaneously with shutting off of application of air pressure internally of the ware so that this compressed air may escape from the ware and insure against distortion of the articles due to excessive internal pressure. This secondary blow provides for application of air pressure to the articles during substantially the entire period of their enclosure in the finishing mold and insures more perfect setting and cooling of the glass than where only the usual blowing operation is utilized.

The movement of the knock-out disks 161 is effected in the following manner. At a predetermined point in the lowering of the finishing mold, the rock shaft actuating mechanism shown in Figs. 11 to 15 operates to rock the shaft 162 to align the knock-out disks 161 with the articles in the finishing mold and simultaneously move said disks into contact with the open ends of said articles. This movement of the disks 161 is caused by engagement of the cam roll 182 (Fig. 11) with the upper end of the offset 192 on the cam 183, such engagement causing rocking of the arms 181 and 176 by which the rock shaft 162 is moved downwardly in its bearing 163. The angular slot 172 and pin 171 coact to rock the shaft 162 simultaneously with longitudinal movement of the latter in the bearing 163. Thus, the knock-out disks 161 are brought into operative engagement with the upper ends of the articles in the finishing mold. When the finishing mold nears the lower end of its path of movement, the cam roll 182 under influence of the coil spring 184 moves downwardly and coacts with the coil spring 169 surrounding the rock shaft 162 to move the latter to its original and normal position. This return of the knock-out disks 161 to their normal positions is effected just following opening of the finishing mold. By adjusting the nuts 168 upon the disk carrying stems 165, the spacing of the disks from the arm 160 and the time interval between discharge of the bottles or other articles may be accurately controlled.

Manifestly, certain minor changes may be resorted to within the spirit and scope of the appended claims.

What I claim is:

1. A glassware forming machine comprising a finishing mold adapted to swing downward from a blank transfer and blowing station to a ware ejecting station, a knock-out arm, knock-out disks carried by said arm and adapted at times to seat upon the open ends of articles in the finishing mold, cam mechanism to alternately seat and unseat the knock-out disks, and means to apply blowing air through the knock-out arms and disks to the articles in the finishing mold during a portion of the downward movement of the latter.

2. A glassware forming machine comprising a finishing mold adapted to swing downward from a blank transfer and blowing station to a ware ejecting station, a knock-out arm, knock-out disks carried by said arm and adapted at times to seat upon the open ends of articles in the finishing mold, cam mechanism to alternately seat and unseat the knock-out disks, and means to apply blowing air through the knock-out arm and disks to the articles in the finishing mold during a portion of the downward movement of the latter, said means including a cam actuated valve controlling flow of air to the knock-out arm and disks.

3. A glassware forming machine comprising a stationary blank mold, means to open and close the blank mold at predetermined intervals, a finishing mold, means to swing the finishing mold about a horizontal axis to enclose parisons formed in said blank mold, means to blow the blanks to the form of the finished articles while the finishing mold is in its uppermost position, and means for applying air pressure internally of the ware while the finishing mold is being lowered.

4. A glassware forming machine comprising a finishing mold movable from a blank transfer and blowing station to a ware ejecting station, knock-out disks adapted to seat upon the open ends of ware in the finishing mold during a portion of the movement of the latter, and means to apply blowing air internally of the articles in the finishing mold through said knock-out disks.

5. A glassware forming machine including a finishing mold mounted for vertical swinging movement between blank receiving and finished ware ejecting stations, means to apply air pressure internally of the ware during movement between said stations, and means to release the air pressure just prior to arrival of the mold at the ware ejecting station.

6. In glassware forming apparatus, a finishing mold, a knock-out arm, knock-out disks mounted on said arm, a rock shaft carrying the knock-out arm and disks, a bearing slidably and oscillatively supporting said shaft, said arm, disks and shaft having communicating air passageways therethrough, and cam mechanism causing movement of said rock shaft in the bearing to effect alternate operative and inoperative positioning of the knock-out disks with respect to the cavities in said mold.

7. In a machine for forming hollow glass articles, the combination of a support, a mold thereon, means to introduce a parison into the mold, a blow head movable into operative relation to the mold, means for supplying air under pressure to said blow head and thereby expanding the parison within the mold, means for swinging the mold vertically downward relative to said support to a discharging position, and means moving with the mold between the parison expanding and discharging positions for effecting the final blowing operation while the mold is in said discharging position.

8. In a machine for forming hollow glass articles, the combination of a mold comprising separable sections and a mold bottom, means for separating the mold sections, a device for engaging the upper end of an article in the mold and holding said article during the separation of the mold sections, and means for supplying air through said device and applying it to the interior of the article prior to the separation of the mold sections.

9. In a glass forming machine, the combination of a finishing mold comprising separable sections, a mold bottom, a neck mold in register with the finishing mold, means for blowing an article to finished form within the finishing mold, means for removing the neck mold, leaving the upper end of said article exposed, a blowing head movable into engagement with said end, means for supplying air under pressure through said blowing head, and means for separating the finishing mold sections while the article is held between the mold bottom and said blowing head.

10. In a glassware forming machine, a mold carriage, a partible finishing mold mounted thereon, means for moving the mold between a blank transfer station and a ware ejecting station, a knock-out disk adapted to seat upon the upper end of a blank in said finishing mold during movement of the latter to the ware ejecting station and after opening of said mold, a movable carrier for said disk mounted on the finishing mold, an air pressure chamber embodied in the carrier, and means including an axial passageway through the knock-out disk to convey air under pressure from said chamber to the interior of the blank to blow the latter to its final form.

11. In a machine for forming hollow glass articles, the combination of a mold, means for blowing a parison of glass to hollow form within the mold, means to open the mold, a head to engage the open end of the article and hold it during the opening of the mold, and means to supply air under pressure through said head to the interior of said article.

12. In a glass forming machine, the combination of a mold including a body portion comprising separable sections and a mold bottom, a blowing head, means for moving said head into engagement with the open end of an article in the mold and holding said head in contact with the article during the separation of said mold sections, and means to supply air under pressure through said head to the interior of said article.

13. In a glass forming machine, the combination of a body blank mold, a neck mold, means for introducing a charge of glass into said molds and forming a parison therein, a finishing mold, means for transferring the parison to the finishing mold while supported in the neck mold, means for blowing the parison to form a hollow article in the finishing mold, means for opening the neck mold, a head movable into engagement with the open end of the blown article, means for blowing air through said head into said article, and means for opening the finishing mold while the article is held by said head.

14. In a machine for forming hollow glass articles, the combination of a neck mold, a body blow mold in register therewith, means to blow a parison of glass to hollow form within said molds, means to then open the neck mold leaving the article within the body mold, and means to supply blowing air to the article within the body mold after the neck mold has opened.

Signed at Toledo, in the county of Lucas and State of Ohio, this 13th day of May, 1927.

LEONARD D. SOUBIER.